(12) United States Patent
Charpentier et al.

(10) Patent No.: US 12,049,831 B2
(45) Date of Patent: Jul. 30, 2024

(54) METHOD FOR THE REPAIR WELDING OF AN AIRCRAFT TURBINE ENGINE BLADE

(71) Applicant: SAFRAN AIRCRAFT ENGINES, Paris (FR)

(72) Inventors: Pascal Jean-Marc Charpentier, Moissy-Cramayel (FR); Romain Jean-François Guerit, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 57 days.

(21) Appl. No.: 17/765,955

(22) PCT Filed: Oct. 1, 2020

(86) PCT No.: PCT/FR2020/051721
§ 371 (c)(1),
(2) Date: Apr. 1, 2022

(87) PCT Pub. No.: WO2021/069815
PCT Pub. Date: Apr. 15, 2021

(65) Prior Publication Data
US 2022/0341325 A1  Oct. 27, 2022

(30) Foreign Application Priority Data
Oct. 7, 2019  (FR) ........................ 1911073

(51) Int. Cl.
*F01D 5/00* (2006.01)
*B23P 6/00* (2006.01)
(Continued)

(52) U.S. Cl.
CPC .............. *F01D 5/005* (2013.01); *B23P 6/007* (2013.01); *B23P 15/006* (2013.01); *F01D 5/34* (2013.01);
(Continued)

(58) Field of Classification Search
CPC .. F01D 5/005; F01D 5/34; B23P 6/007; B23P 15/006; B23K 2101/001; B23K 26/342;
(Continued)

(56) References Cited

U.S. PATENT DOCUMENTS 5,553,370 A * 9/1996 Pepe ...................... F01D 5/005
228/119
5,701,669 A * 12/1997 Meier .................... B23K 35/32
29/889.1
(Continued)

FOREIGN PATENT DOCUMENTS

DE  42 37 052 A1  5/1994
DE     4237052 A1 *  5/1994  ......... B23K 37/0443
(Continued)

OTHER PUBLICATIONS

English translation of Written Opinion mailed Jan. 19, 2021, issued in corresponding International Application No. PCT/FR2020/051721, filed Oct. 1, 2020, 4 pages.
(Continued)

*Primary Examiner* — John M Zaleskas
(74) *Attorney, Agent, or Firm* — CHRISTENSEN O'CONNER JOHNSON KINDNESS PLLC

(57) ABSTRACT

A method repairs welding of an aircraft turbine engine blade that has a lower surface and an upper surface connected by a leading edge and a trailing edge. The blade further includes a free end referred to as the tip. The method includes the repair welding of the tip and including the steps of: securing a first stop to the leading edge at the tip and a second stop to the trailing edge at the tip, depositing a repair weld bead on the tip, from the first stop to the second stop, and removing the first and second stops. The first and second stops are secured solely by squeezing same on the leading and trailing edges.

9 Claims, 8 Drawing Sheets

(51) Int. Cl.
*B23P 15/00* (2006.01)
*F01D 5/34* (2006.01)

(52) U.S. Cl.
CPC .... *F05D 2230/31* (2013.01); *F05D 2240/307* (2013.01)

(58) Field of Classification Search
CPC ............. F05D 2230/31; F05D 2230/80; F05D 2240/307
See application file for complete search history.

(56) References Cited

U.S. PATENT DOCUMENTS

| | | | | |
|---|---|---|---|---|
| 6,161,750 | A * | 12/2000 | Yang | B23K 37/06 228/215 |
| 6,568,077 | B1 * | 5/2003 | Hellemann | B23P 6/005 228/19 |
| 2005/0173496 | A1 * | 8/2005 | Sato | B23K 37/06 228/256 |
| 2006/0193612 | A1 * | 8/2006 | Bouet | B23K 35/325 392/408 |
| 2007/0023485 | A1 * | 2/2007 | Bouet | B23K 15/0006 228/119 |
| 2008/0000947 | A1 * | 1/2008 | Derrien | B23P 6/005 228/49.1 |
| 2008/0201947 | A1 * | 8/2008 | Richter | B23P 6/007 219/121.64 |
| 2009/0241339 | A1 * | 10/2009 | Hasselberg | B23K 37/0435 29/889.1 |
| 2013/0136868 | A1 * | 5/2013 | Bruck | B23K 26/342 427/532 |
| 2014/0334936 | A1 * | 11/2014 | Marchione | B23K 26/342 29/889.1 |
| 2015/0129583 | A1 * | 5/2015 | Richter | B22F 10/28 219/601 |
| 2015/0314403 | A1 * | 11/2015 | Bruck | B22F 12/222 219/76.14 |
| 2017/0080529 | A1 * | 3/2017 | Arjakine | F01D 9/02 |
| 2017/0304895 | A1 * | 10/2017 | Porch | B22F 12/41 |
| 2018/0200800 | A1 * | 7/2018 | Hart | B22F 10/47 |

FOREIGN PATENT DOCUMENTS

| | | | |
|---|---|---|---|
| DE | 195 47 903 C1 | 3/1997 | |
| DE | 10 2004 042 878 A1 | 3/2006 | |
| DE | 10 2009 043 136 A1 | 3/2011 | |
| DE | 102009043136 A1 * | 3/2011 | ............. B23K 31/02 |
| EP | 1 153 699 A2 | 11/2001 | |

OTHER PUBLICATIONS

International Preliminary Report on Patentability mailed Apr. 12, 2022, issued in corresponding International Application No. PCT/FR2020/051721, filed Oct. 1, 2020, 6 pages.
International Search Report mailed Jan. 19, 2021, issued in corresponding International Application No. PCT/FR2020/051721, filed Oct. 1, 2020, 7 pages.
Written Opinion mailed Jan. 19, 2021, issued in corresponding International Application No. PCT/FR2020/051721, filed Oct. 1, 2020, 5 pages.

* cited by examiner

METHOD FOR THE REPAIR WELDING OF AN AIRCRAFT TURBINE ENGINE BLADE

FIELD OF THE DISCLOSURE

The disclosure relates to the field of aircraft turbine engines, and in particular, the repair of the tips of the blades of one-piece bladed discs (known by the French acronym DAM) of an engine of the type GE 90-115K. More specifically, the object of the disclosure is to enable the implementation of the repair welding of the blades in the context of a new development based on an additive manufacturing reconditioning technology (LMD, acronym of "Laser Metal Deposition").

BACKGROUND

The technical background comprises in particular documents DE 42 37 052 A1, DE 10 2009 043136 A1 and DE 195 47 903 C1.

In a known way, for the repair of the blade tips of one-piece bladed discs, a repair welding of the tips is made by an additive manufacturing method by powder deposition and fusion, also known as the LMD-p method (acronym of "Laser Metal Deposition-powder").

It is a linear repair welding, operated from the leading edge of a blade to the trailing edge of the blade. A linear repair welding necessarily includes a start and an end of the bead.

Problem to be solved: The beginning and end zones of the bead are considered sensitive from a metallurgical health point of view, and may comprise defects such as lack of bonding, or collapse, which are not acceptable from a technical and quality point of view.

The main cause of the defects, comes on the one hand from the geometry of each end of the blade, linked to the radius of the leading edge, and on the other hand, the thickness of each end of the blade (leading edge or trailing edge).

To avoid finding these sensitive zones in a finished part, stops are used.

These stops are martyrdom parts, i.e. sacrificial, affixed to a blade, usually by a welding method, in particular by pointing.

The attachment of a stop to the blade must be sufficient, for example by penetrated welding, to ensure that it remains in place during repair welding, while avoiding the risk of sticking, but must also be limited to a minimum so as not to affect the final part metallurgically and dimensionally. A zone of the finished part that is metallurgically affected is referred to as the Thermally Affected Zone; and a zone of the finished part that is dimensionally affected is referred to as the Deformation Zone of the blade.

The stops, also known as pointing stops, used so far are based on standard stop geometries.

FIG. 1 shows a one-piece bladed disc 10 consisting of a plurality of blades 12 on which stops 14a, 14b are arranged according to the prior art. The stop 14b is arranged on the leading edge 11 of the blade 12, while the stop 14a is arranged on the trailing edge 13 of the blade 12. The protuberances 16b, 16a surrounding the leading and trailing edges on the pressure side and suction side allow the stop 14a, 14b to be pointed at the blade 12. In particular, the protuberance 16b surrounds the leading edge in the pressure side and suction side, while the protuberance 16a surrounds the trailing edge in the pressure side and suction side of the blade 12. The pressure side of the blades 12 of the one-piece bladed disc 10 is shown in FIG. 1 and in the dotted box B, while the suction side of a blade 12 is shown in the dotted box C.

However, the balance between the penetration of the pointing to ensure a good maintenance of the stops and the lightness of the pointing to avoid downed zones, i.e. Thermally Affected Zones, on a blade has not yet been found.

Indeed, during the first repair weldings, the stops systematically collapsed, resulting in unacceptable radiographic indications.

For example, FIG. 2 shows a blade 12 of a one-piece bladed disc that collapsed during repair welding using an LMD-p process. In this figure, the A lines show the collapse of the trailing edge of the blade 12.

Several tests were carried out to avoid the collapse of the blades of the one-piece bladed discs during a repair welding carried out by LMD-p method. The tests were all performed on three blades. X-rays were carried out after each pointing, in order to highlight any blowholes or linear indications.

The stops shown in FIGS. 3a, 3b, 5a, 5b, 7a, 7b, 9a and 9b illustrate standard geometries of stops that are secured by pointing onto blades.

It has been suggested to shorten the protuberances of the stops, in order to avoid their collapse. FIGS. 3a and 3b show a blade 12, to which a stop 24 with a shortened protuberance 26 compared to the protuberances in FIG. 1 is secured by pointing.

However, as shown in FIG. 4 which represents an X-ray of the blade 12 of FIGS. 3a and 3b, with such stops 24, blowholes, as well as a linear indication, are observed on the X-rays.

In order to eliminate the lack of bonding, it was proposed to increase the power at the beginning and end of the bead for the first pass (leading edge to trailing edge over a length of 15 mm). However, this resulted in greater penetration at the leading and trailing edges of the blade 12.

It has also been suggested to lighten the stop, while keeping the same geometry. FIGS. 5a and 5b show a blade 12, to which a stop 34 is secured by pointing, lightened with respect to the stops of the FIG. 1.

However, as shown in FIG. 6, which is an X-ray of the blade 12 in FIGS. 5a and 5b, with such stops 34, blowholes, as well as too much penetration, are observed on the X-rays.

It has also been suggested that the height of the stop should be modified to keep the tip of the blade as free as possible and to maintain contact with the leading edge of the blade. FIGS. 7a and 7b show a blade 12, to which a stop 44 is secured by pointing, the height of which is modified on the tip 44 of the blade 12 with respect to the stops of FIG. 1. In FIG. 7a, the dimension d1 is substantially equal to 3.0 mm and the dimension d2 is substantially equal to 0.5 mm.

However, as shown in FIG. 8 which represents an X-ray of the blade 12 of FIGS. 7a and 7b, with such stops 44, linear indications, bonding problems, as well as blowholes with collapses on the leading and trailing edge of the blade due to the change in power to avoid the lack of linear bonding, are observed on the X-rays.

It has also been suggested to clear the tip of the blade to avoid missing connections. FIGS. 9a and 9b show a blade 12, to which a stop 54 is secured by pointing, the height of which is modified to clear the tip of the blade 12 compared to the stops in FIG. 1.

However, with such stops 54, blowholes, linear indications and excessive penetration are systematically observed on X-rays. These drawbacks are due to the pointing of the stops 54 on the blade 12.

The objective of the disclosure is to propose a solution to remedy at least some of these drawbacks.

In particular, the present disclosure proposes to review the method of securing the stops to turbine engine blades, and in particular to the blades of a one-piece bladed disc.

SUMMARY

To this end, the disclosure relates to a method for the repair welding of an aircraft turbine engine blade, the blade comprising a pressure side and a suction side connected by a leading edge and a trailing edge, the blade further comprising a free end called a tip, the method comprising a repair welding of this tip and comprising the steps consisting of:

securing a first stop to the leading edge at the tip and a second stop to the trailing edge at the tip, depositing a repair weld bead on the tip from the first stop to the second stop, and removing the first and second stops, the method being characterised in that the first and second stops are secured solely by squeezing the first and second stops on the leading and trailing edges.

Thus, the present disclosure advantageously proposes to eliminate the pointing of the stops.

According to the disclosure, the stops are maintained by mechanical effect, and more precisely by squeezing, on the blade. This attachment method advantageously allows to avoid the generation of Thermally Affected Zones on the blades, while ensuring sufficient maintenance. The disclosure therefore allows to eliminate the need to point the stops.

The use of the same power for the deposition of the repair weld bead allows to avoid a collapse of the trailing edge or the leading edge of the blade, and a too important penetration, which are due to the change of power between the beginning and the end of the bead.

According to the disclosure, the turbine engine blade may be a blade of a one-piece bladed disc.

According to the disclosure, the step of depositing the repair weld bead can be carried out by additive manufacturing by powder deposition and fusion.

According to the disclosure, the first and second stops may be made of the same material as the material of the repair weld bead.

In particular, the first and second stops and the repair weld bead can be made of titanium loaded with 6% aluminum and 4% vanadium (TA6V).

Advantageously, the use of such a material allows a high strength of the stops, while having a high ductility of the latter.

According to the disclosure, the method may also comprise, prior to the step of securing the first and second stops, a step consisting of preheating, by means of a laser, the first stop.

According to the disclosure, the first and second stops may have a predetermined stiffness (adjusted to each blade), to exert a force so as to maintain the squeezing of the first and second stops on the leading and trailing edges.

Advantageously, the zone of each stop which ensures the maintenance on the blade has a sufficient stiffness to ensure a spring effect which maintains the stop on the blade by squeezing.

According to the disclosure, the first and second stops may each have an undercut extending from the tip, along the leading edge and trailing edge respectively.

Advantageously, the part of each stop which squeeze the blade is not in contact with the molten repair welding zone, in particular due to the undercut, which allows to avoid finding infused material in the repair welding zone.

According to the disclosure, the first and second stops can be secured to the leading and trailing edges with a clearance of 0.05 mm or less.

Thus, the geometry of the first and second stops conforms to the shape of the blade, so as to avoid a clearance between the stops and the blade greater than 0.05 mm.

According to the disclosure, the length of the first and second stops along the pressure side and/or the suction side may be greater than or equal to 0.5 mm.

Advantageously, the first and second stops thus have a sufficient length in the continuity of the blade, i.e. at the leading and trailing edges, to ensure a correct start and end of the bead.

The height of the first and second stops is sufficient to ensure that the stops have good orientation along the leading and trailing edges. For example, the height of the first and second stops along the leading and trailing edges respectively may be greater than or equal to 1 mm, more precisely greater than or equal to 8 mm, even more precisely greater than or equal to 10 mm.

The difference in height between the first and second stops may be greater than or equal to 0.1 mm.

According to the disclosure, the first and second stops may each comprise first and second portions arranged opposite each other, the first portion being arranged on the pressure side and the second portion being arranged on the suction side. In this case, the method may also comprise, prior to the step of securing the first and second stops, a step consisting of tightening the first and second portions of each stop.

Advantageously, each stop is thus adjusted on a blade by tightening the first and second portions of each stop, thus optimising the squeezing effect of the stops on the blade.

In particular, when fitting the stops to the blade, an operator can adjust the tightness of the first and second portions of the stops with a tool, such as pliers.

DESCRIPTION OF THE DRAWINGS

The present disclosure will be better understood and further details, features and advantages of the present disclosure will become clearer from the following description of a non-limiting example, with reference to the attached drawings in which.

The elements having the same functions in the different implementations have the same references in the figures.

DETAILED DESCRIPTION

Figure 1:
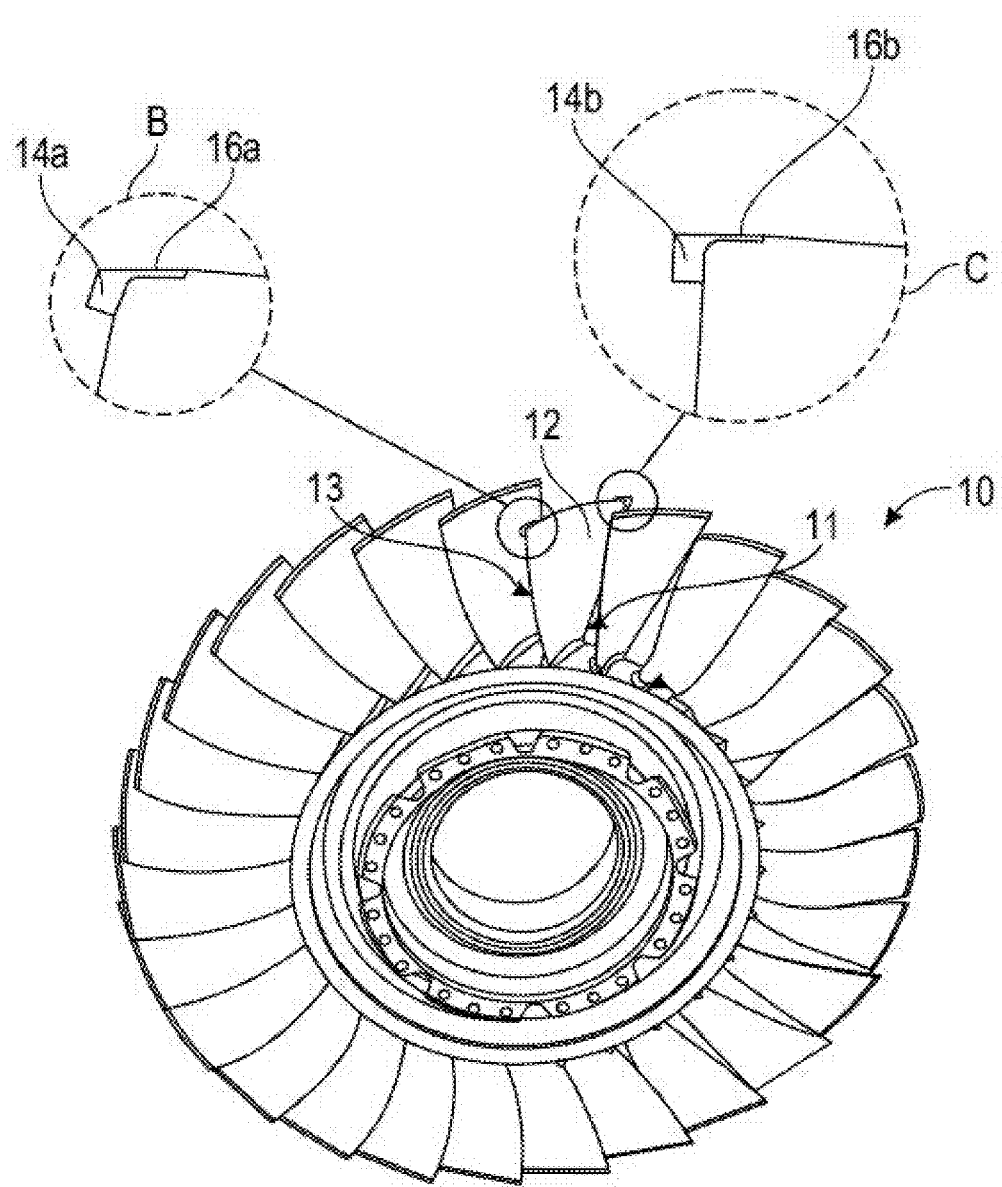
FIG. 1, already described, schematically represents a one-piece bladed disc, with stops according to the prior art, FIG. 2, already described, shows an X-ray of a blade of the one-piece bladed disc of FIG. 1, FIGS. 3a and 3b, already described, represent very schematically respectively a side view and a top view of a blade of a one-piece bladed disc, with a stop according to a first test of the prior art, FIG. 4, already described, shows an X-ray of a blade of the one-piece bladed disc of FIGS. 3a and 3b, FIGS. 5a and 5b, already described, represent very schematically respectively a side view and a top view of a blade of a one-piece bladed disc, with a stop according to a second test of the prior art, FIG. 6, already described, shows an X-ray of a blade of the one-piece bladed disc of FIGS. 5a and 5b, FIGS. 7a and 7b, already described, represent very schematically respectively a side view and a top view of a blade of a one-piece bladed disc, with a stop according to a third test of the prior art, FIG. 8, already described, represents an X-ray of a blade of the one-piece bladed disc of FIGS. 7*a* and 7*b*, FIGS. 9*a* and 9*b*, already described, represent very schematically respectively a side view and a top view of a blade of a one-piece bladed disc, with a stop according to a fourth test of the prior art.
Figure 2:
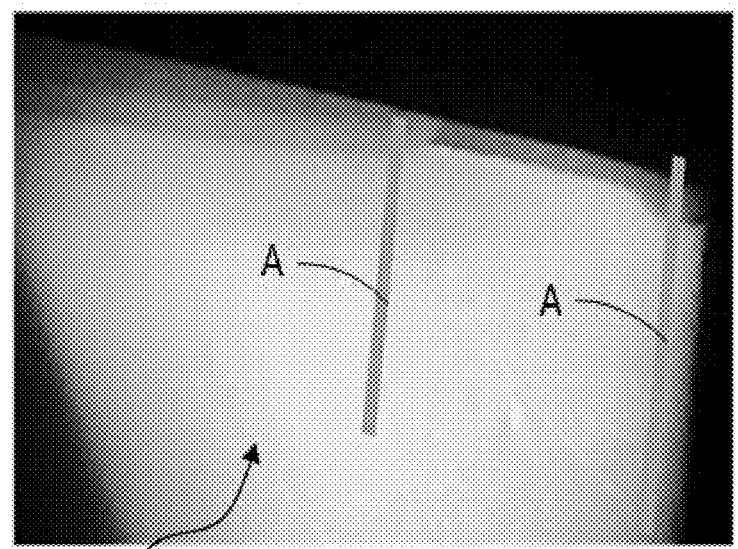
Figure 3A:
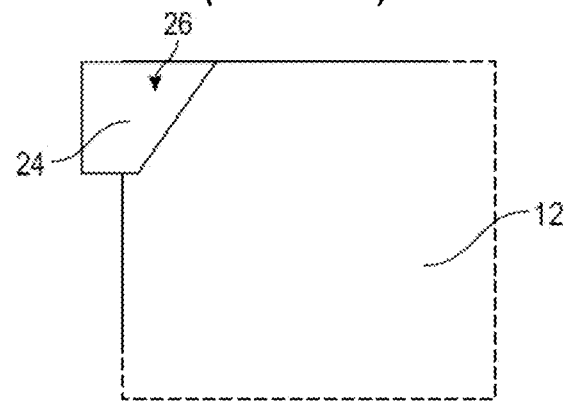
Figure 3B:
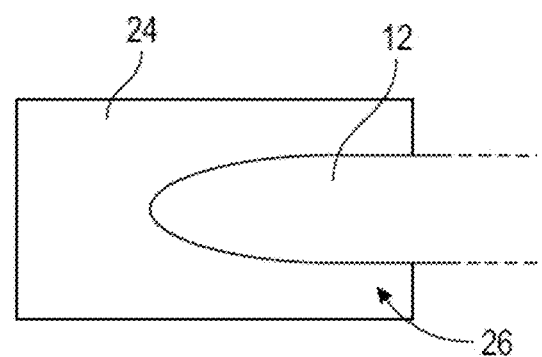
Figure 4:
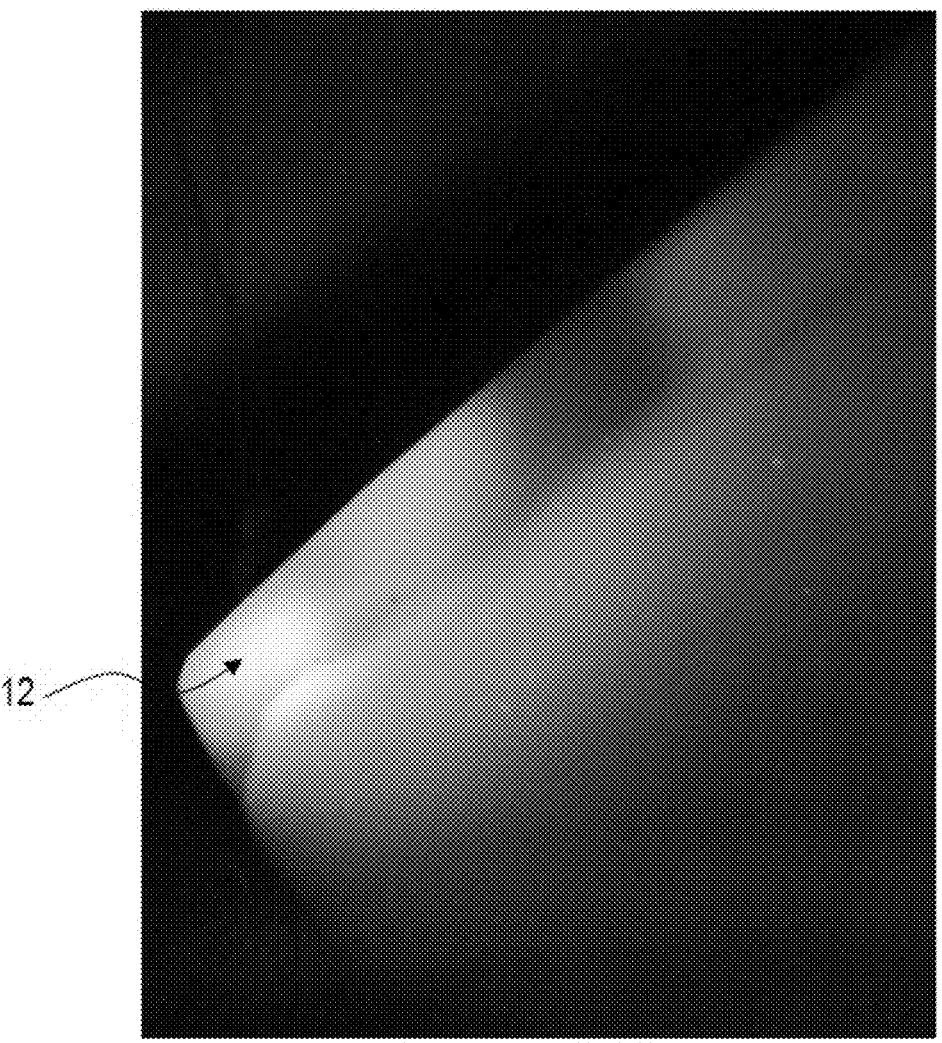
Figure 5A:
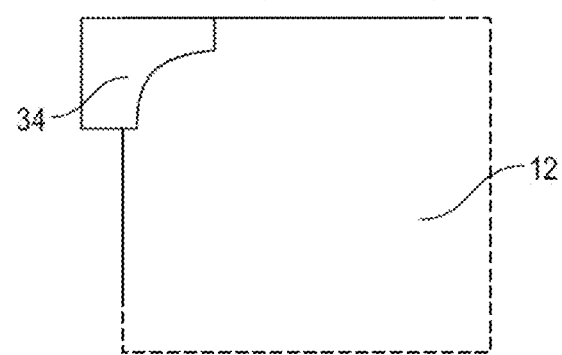
Figure 5B:
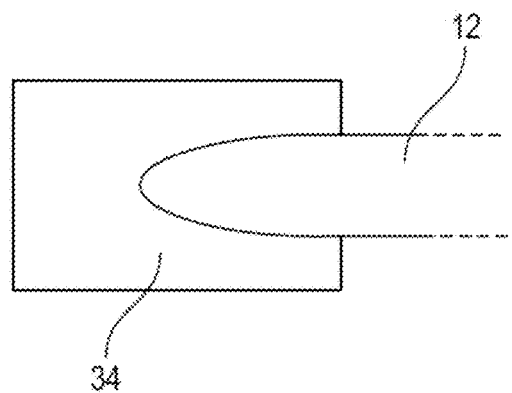
Figure 6:
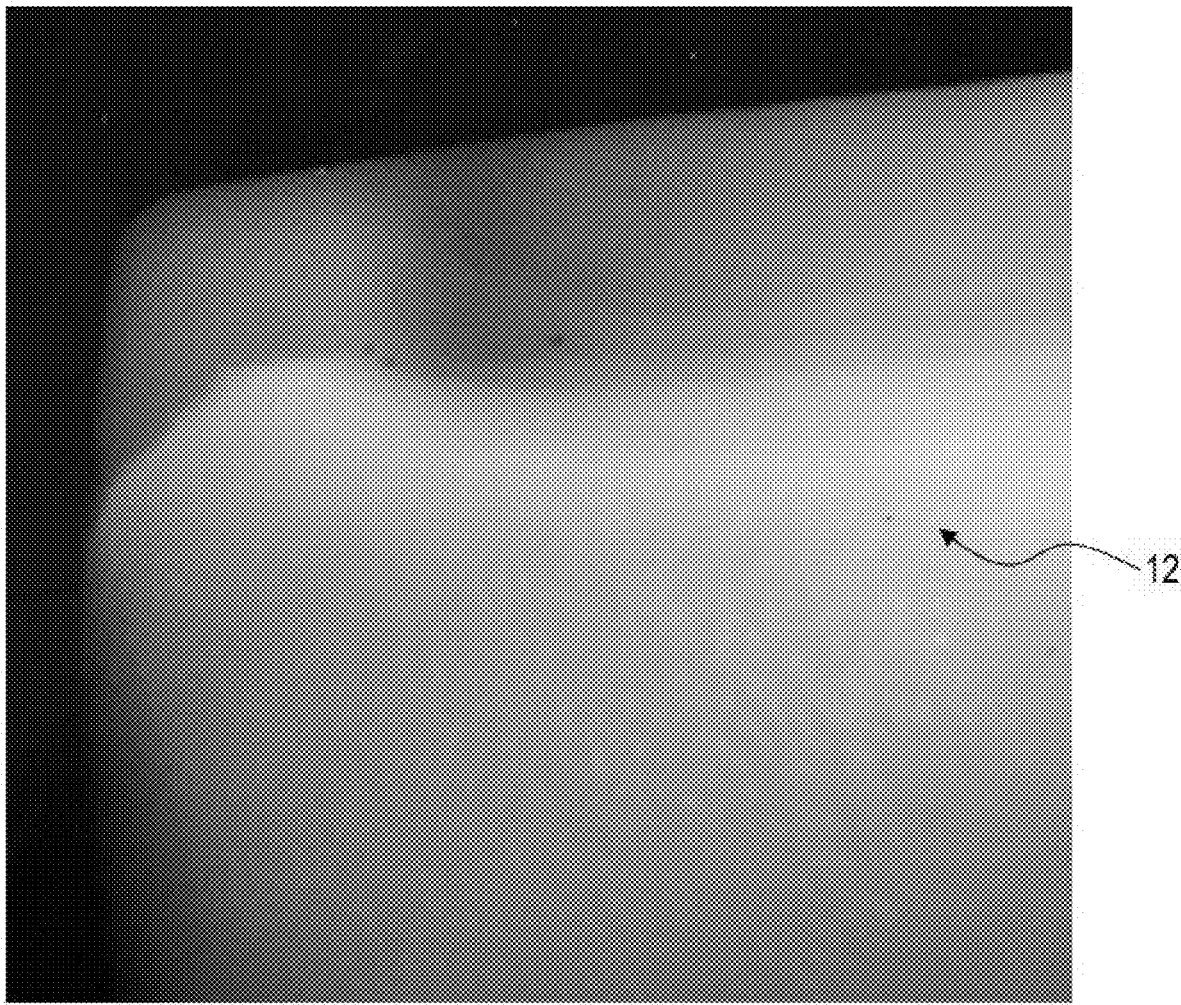
Figure 7A:
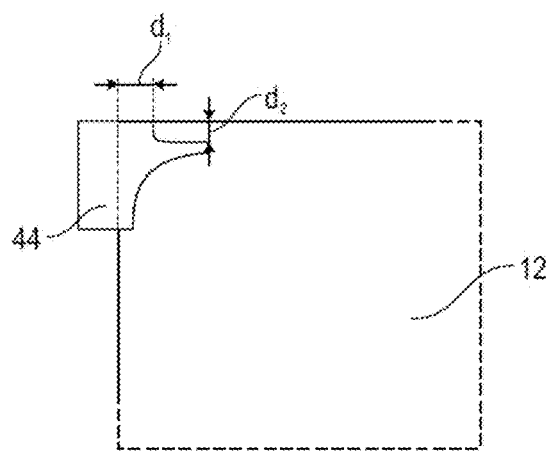
Figure 7B:
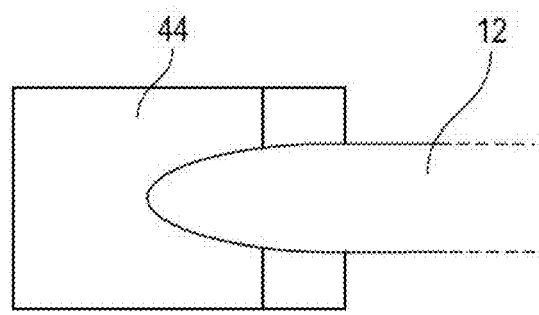
Figure 8:
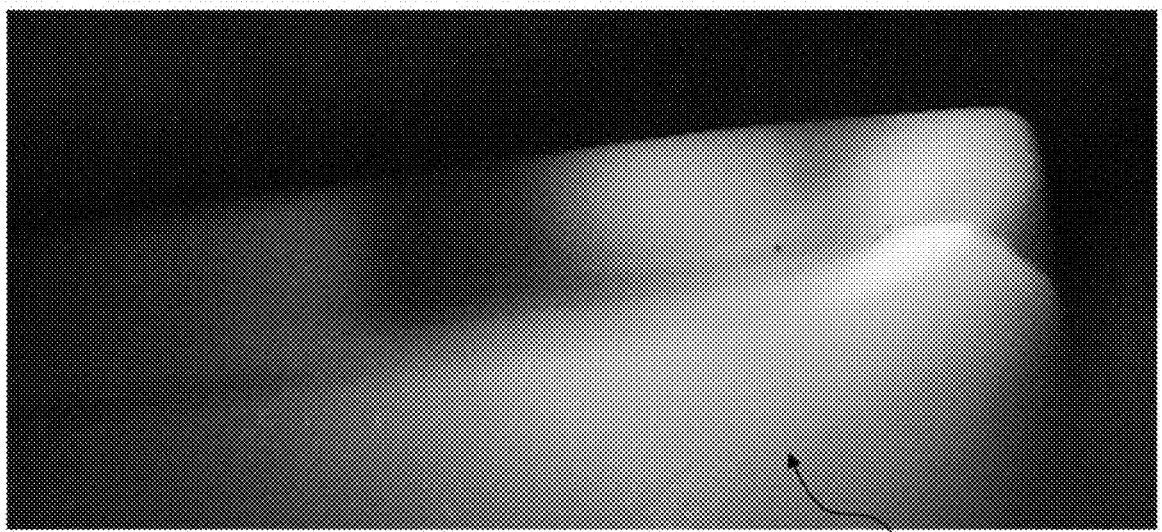
Figure 9A:
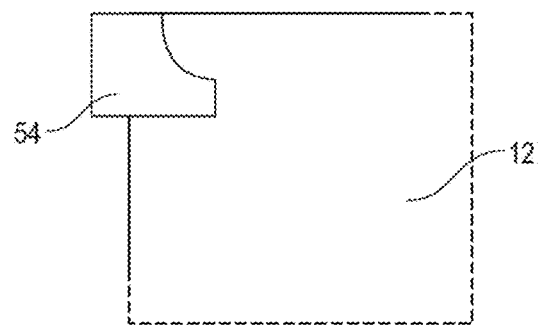
Figure 9B:
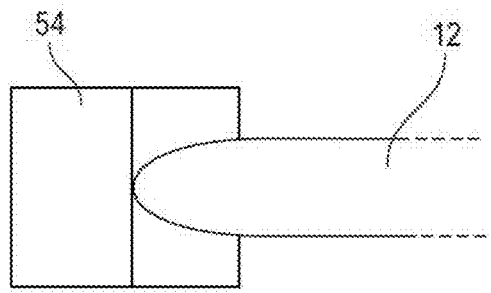
Figure 10:
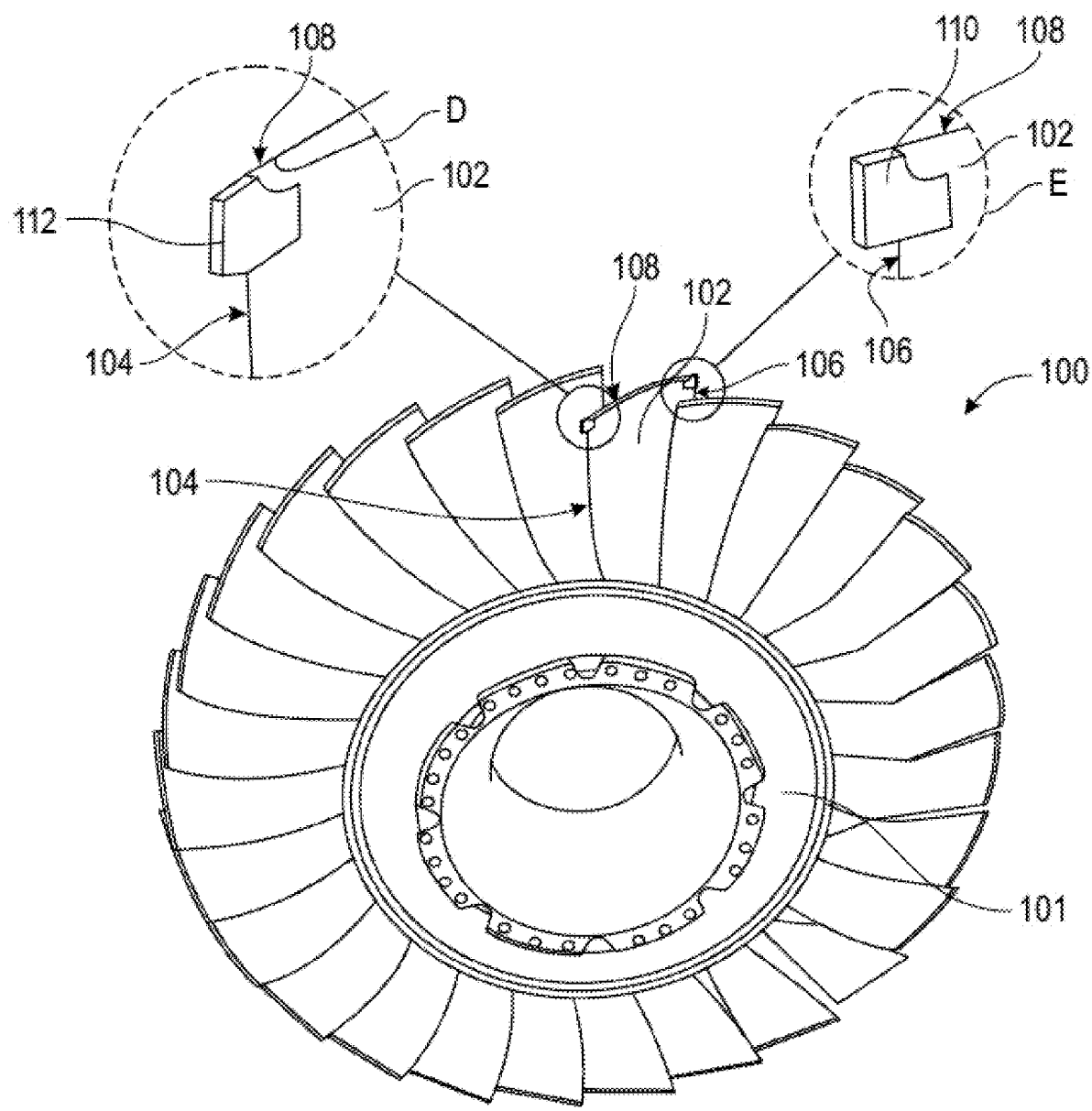
FIG. 10 shows schematically a one-piece bladed disc with stops according to the disclosure, FIGS. 11*a* and 11*b* schematically represent perspective views of a stop of a trailing edge according to the disclosure.

FIG. 10 shows a one-piece bladed disc 100 of an aircraft turbine engine, comprising blades 102. A one-piece bladed disc is a one-piece element of a turbojet engine, in part compressor or turbine, consisting of vanes and a vane disc 101. A one-piece bladed disc is generally made by machining a homogeneous block of metal. Each vane comprises a vane root (not shown) and a blade 102.

A blade 102 comprises a pressure side and suction side joined together by a leading edge 106 and a trailing edge 104. A blade 102 further comprises a free end called a tip 108.

The disclosure relates to a method for the repair welding of a blade 102. The method comprises a repair welding of the tip 108 of the blade 102, and also comprises securing a first stop 110 to the leading edge 106 at the tip 108 and securing a second stop 112 to the trailing edge 104 at the tip 108. In particular, the stops 110, 112 are secured solely by squeezing the stops 110, 112 on the leading and trailing edges 106, 104.

Thereafter, the method comprises depositing a repair weld bead on the tip 108 from the first stop 110 to the second stop 112. The deposition of the repair weld bead may be performed by additive manufacturing by powder deposition and fusion.

Thereafter, the process comprise removing the stops 110, 112.

The method may comprise, prior to securing the stops 110, 112, preheating, in particular by means of a laser, the stop 110. The preheating of the stop 110 allows the stop to be warmed up to avoid the effect of the hot stop and the cold blade.

In FIG. 10, the dotted box E shows the first stop 110 squeezed to the leading edge 106, at the tip 108; and the box D shows the second stop 112 squeezed to the trailing edge 104, at the tip 108. In this figure and in the box D, the pressure side of each blade 102 of the one-piece bladed disc 100 is shown, while in the box E, the suction side of a blade 102 is shown.

The stops 110, 112 may be made of the same material as the material of the repair weld bead. For example, the stops 110, 112 and the reloading bead may be made of titanium filled with 6% aluminum and 4% vanadium (Ti-6Al-4V). Thus, the stops 110, 112 are made of the same metal as the filler metal.

Each stop 110, 112 has a predetermined stiffness, which is adjusted when the stop is fitted, to exert a force so as to maintain the squeezing of this stop on the leading or trailing edge 106, 104.

The zone of the stop 110, 112 providing the maintenance thus has a sufficient stiffness to provide the spring effect that maintains this stop on the blade 102 by squeezing.

The stops 110, 112 are secured to the leading and trailing edges 106, 104 with a clearance of $5/100$ or less. In other words, the stops 110, 112 are configured so that the clearance between the stop and the blade 102 to which it is secured is not greater than $5/100$.

Figure 11A:
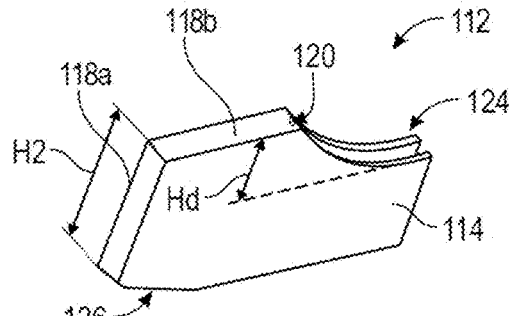
Figure 11B:
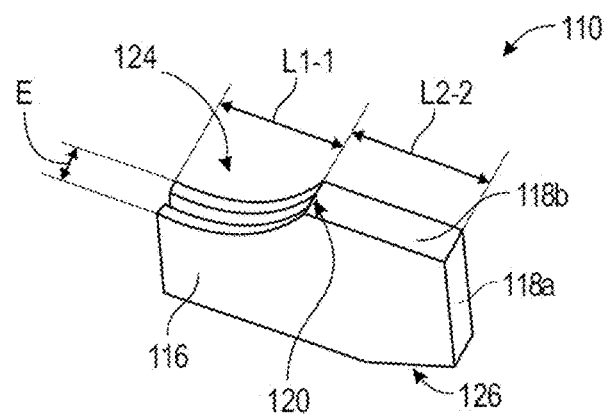
Figure 12:
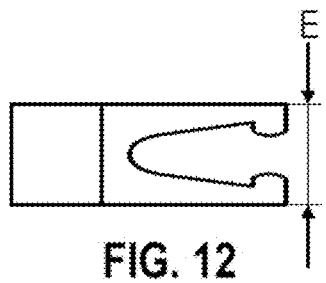
FIG. 12 shows schematically a bottom view of the stop of FIGS. 11*a* and 11*b*, FIGS. 13*a* and 13*b* schematically represent perspective views of a stop of a leading edge according to the disclosure, and FIG. 14 schematically represents a side view of the stop of FIGS. 13*a* and 13*b*.
Figure 13A:
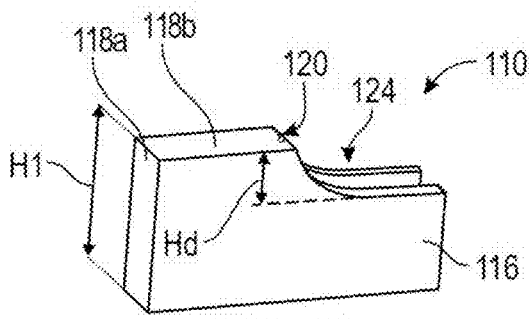
Figure 13B:
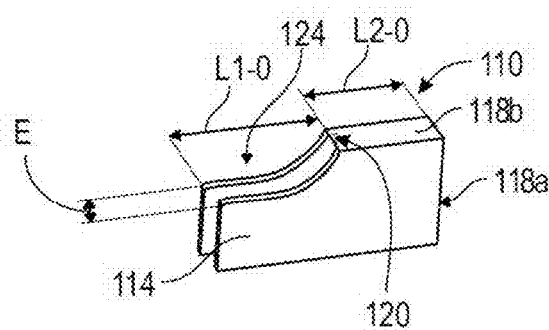
Figure 14:
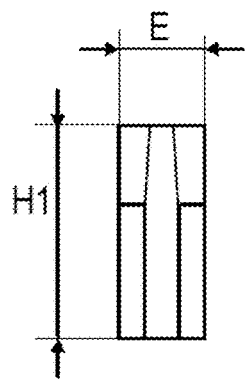

FIGS. 13*a*, 13*b* and 14 show a stop 110 intended to be secured to a leading edge 106 of a blade 102; and FIGS. 11*a*, 11*b* and 12 show a stop 112 intended to be secured to a trailing edge 104 of a blade 102.

Each stop 110, 112 comprises a first portion 114 and a second portion 116 arranged opposite each other. The portions 114, 116 are substantially planar and parallel to each other.

The first portion 114 is configured to be arranged on the pressure side of the blade 102, while the second portion 116 is configured to be arranged on the suction side of the blade 102. Thus, each portion 114, 116 is arranged on an opposite side of the blade 102. The first and second portions 114, 116 are shaped to squeeze the leading edge 106 or the trailing edge 104 of the blade 102.

Each stop 110, 112 comprises a third portion 118*a*, 118*b* connecting the first and second portions 114, 116 together. The third portion comprises a first part 118*a* of polygonal, for example substantially parallelepipedal, shape connected to a second part 118*b* of polygonal form, for example substantially parallelepipedal, shape. The parts 118*a*, 118*b* are substantially orthogonal to each other.

The third portion 118*b* comprises a groove 120, extending substantially parallel to the leading or trailing edge 106, 104, between the first and second portions 114, 116. The groove 120 is configured such that the leading or trailing edge 106, 104 is arranged therein. In other words, the leading or trailing edge 106, 104 is arranged in the groove 120 along this latter.

The groove 120 extends along the leading or trailing edge 106, 104 and into the continuity of the tip 108.

The groove 120 forms an abutment of the leading edge 106 or trailing edge 104 of the blade 102. Indeed, when the stop 110, 112 is secured to the blade 102, the first and second portions 114, 116 are positioned respectively on the pressure side and the suction side of the blade 102, while the groove 120 is positioned in continuity with the blade 102, along the leading edge 106 or trailing edge 104.

The length L1-0, L1-1 of the stops 110, 112 along the pressure side and suction side, i.e. the length of the first and second portions 114, 116 along the pressure side and suction side, may be greater than or equal to 0.5 mm, in particular greater than or equal to 5 mm. For example, the length L1-1 in FIG. 11*b* may be 7.0 mm and the length L1-0 in FIG. 13*b* may be 6.7 mm.

The length L2-0, L2-2 of the third portion 118*b* may be greater than or equal to 0.5 mm, in particular, greater than or equal to 5 mm. For example, the length L2-2 of FIG. 11*b* may be equal to 6.35 mm and the length L2-0 of the FIG. 13*b* may be equal to 6.3 mm.

Such a length in the continuity of the blade 102, from the leading edge 106 or trailing edge 104, ensures the correct start and end of the bead.

Thus, the length L1-0, L1-1 of the first and second portions 114, 116 along the pressure side and suction side may be substantially equal to the length L2-0, L2-2 of the third portion 118b.

The height H1, H2 of the stops 110, 112, and thus the third portion 118a, along the leading or trailing edge 106, 104 may be greater than or equal to 1 mm, in particular greater than or equal to 8 mm. For example, the height H2 of the stop 112 in FIG. 11a may be equal to 10 mm, and the height H1 of the stop 110 in FIG. 13a may be equal to 11 mm. In particular, the height of the stops 110, 112 should be sufficient to ensure that they have a good orientation along the leading edge 106 and the trailing edge 104 respectively. The difference in height between the stops 110, 112 may be greater than or equal to 0.1 mm.

The thickness E of the stops 110, 112, and thus the distance between the outer wall of the first portion 114 and the outer wall of the second portion 116, may be greater than or equal to 0.2 mm. The thickness E of the stop 110 may be different from the thickness E of the stop 112. For example, in FIG. 11b, the thickness E of the stop 110 intended to be secured to the leading edge 106 is 1.5 mm. In FIG. 13, the thickness E of the stop 112 intended to be secured to the trailing edge 104 is 1.15 mm.

The distance between the inner wall of the first portion 114 and the inner wall of the second portion 116 is substantially equal to the thickness of the blade 102, i.e. the dimension of the blade 102 between the pressure side and suction side.

Each stop 110, 112 comprises an undercut 124 extending from the tip 108, and along the leading or trailing edge 106, 104. Thus, the part of the stop 110, 112 that clamps the blade 102 is not in contact with the molten zone of the reloading. This avoids the occurrence of molten material in the repair welding.

The height Hd of the undercut 124 may be greater than or equal to 2 mm, in particular substantially equal to 4 mm.

The second stop 112, and more specifically the third portion 118 of the second stop 112, may comprise a second undercut 126, extending from an end of the third portion 118a opposite the tip 108, along the trailing edge 104.

The method may also include, prior to securing the stops 110, 112, tightening the first and second portions 114, 116 of each stop. Thus, each stop 110, 112 is adjusted to each blade 102 by tightening the first and second portions to optimise the squeeze effect.

The invention claimed is:

1. A repair welding method for an aircraft turbine engine blade, said aircraft turbine engine blade comprising a pressure side and a suction side connected by a leading edge and a trailing edge, said aircraft turbine engine blade further comprising a free end called a tip, the repair welding method comprising repair welding of the tip, wherein the repair welding of the tip comprises the steps of:
preheating, by means of a laser, a first stop;
securing the first stop to said leading edge at said tip and a second stop to said trailing edge at said tip,
depositing a repair weld bead on said tip from said first stop to said second stop, and
removing said first and second stops,
wherein said first and second stops are secured solely by squeezing said first and second stops on said leading and trailing edges.

2. The repair welding method according to claim 1, wherein the step of depositing said repair weld bead is carried out by additive manufacturing by powder deposition and fusion.

3. The repair welding method according to claim 1, wherein said first and second stops are made of the same material as the material of said repair weld bead.

4. The repair welding method according to claim 3, wherein said first and second stops and said repair weld bead are made of titanium loaded with 6% aluminum and 4% vanadium.

5. The repair welding method according to claim 1, wherein said first and second stops have a predetermined stiffness so that that the first and second stops exert a force that maintains the squeezing of said first and second stops on said leading and trailing edges.

6. The repair welding method according to claim 1, wherein said first and second stops each have an undercut extending from said tip along said leading edge and said trailing edge, respectively.

7. The repair welding method according to claim 1, wherein said first and second stops are secured to said leading and trailing edges with a clearance of 0.05 mm or less.

8. The repair welding method according to claim 1, wherein a length of said first and second stops along said pressure side and/or said suction side is greater than or equal to 0.5 mm.

9. The repair welding method according to claim 1, said first and second stops each comprising first and second portions arranged opposite each other, said first portion being arranged on said pressure side and said second portion being arranged on said suction side, the method further comprising, prior to the step of securing said first and second stops, a step of tightening said first and second portions of each of said first and said second stops.

* * * * *